United States Patent [19]

Humm

[11] 4,074,081
[45] Feb. 14, 1978

[54] APPARATUS FOR DETECTING THE LEVEL OF DIRECT CURRENT OR VOLTAGE ON A TELEPHONE LINE

[75] Inventor: Arthur James Humm, Farnborough, England

[73] Assignee: Ansafone Limited, London, England

[21] Appl. No.: 674,945

[22] Filed: Apr. 8, 1976

[30] Foreign Application Priority Data

Apr. 10, 1975 United Kingdom .............. 14882/75

[51] Int. Cl.² ............................................. H04M 1/00
[52] U.S. Cl. ................................. 179/84 R; 179/6 R
[58] Field of Search ................ 179/84 R, 84 A, 81 R, 179/84 L, 18 HB, 6 R, 6 E, 2 R, 2 A, 1 MN, 6 AC, 16 AA, 16 A, 99

[56] References Cited

U.S. PATENT DOCUMENTS

| 3,865,992 | 2/1975 | Bouty .................................. 179/84 A |
| 3,875,348 | 4/1975 | Kopec .................................. 179/84 R |
| 3,903,375 | 9/1975 | De Wit ................................ 179/84 A |

*Primary Examiner*—Kathleen H. Claffy
*Assistant Examiner*—Joseph A. Popek
*Attorney, Agent, or Firm*—Browdy and Neimark

[57] ABSTRACT

An apparatus for coupling a machine, such as a telephone answering machine, to a telephone line. Included in the apparatus is an optical isolator having a first semiconductor device which, in use, is connected across the line and emits radiation whose intensity represents the level of direct current flowing through the device. A second semiconductor device receives radiation from the first device and generates a current representing the intensity of the radiation. Initially, the apparatus operates in a voltage monitoring mode, wherein the current through the first device represents the level of direct voltage on the line. The apparatus distinguishes therefore between an incoming ringing signal and an outgoing dialling signal. If an incoming ringing signal is detected and the call is not answered by the subscriber lifting his handset, the apparatus operates to connect an associated telephone answering machine to the line and is then switched to a current monitoring mode. In this mode the current through the first device represents the level of direct current on the line. The level of this current is changed if the subscriber lifts his handset, and the apparatus operates to disconnect the telephone answering machine from the line.

16 Claims, 4 Drawing Figures

APPARATUS FOR DETECTING THE LEVEL OF DIRECT CURRENT OR VOLTAGE ON A TELEPHONE LINE

This invention relates to the detection of direct currents or voltages on telephone lines.

A telephone line is a balanced transmission system and equipment connected to it must not cause asymmetry due to coupling one wire directly or capacitatively to earth potential. A typical example of an apparatus which should be designed to avoid such coupling is an interface system for coupling a telephone answering machine to the telephone line. The system should derive information from d.c. and a.c. signals on the line and then make use of the information to ensure that the telephone answering machine performs reliably and with a full range of facilities.

A first requirement for apparatus for use as an interface between a telephone answering machine and a telephone line is that the apparatus shall discriminate reliably between an incoming ringing signal and a dialling signal which is outgoing from the extension to which the machine is connected. Having identified a ringing signal the apparatus should impose a short delay before the telephone answering machine is connected to the line. This delay gives the subscriber a chance to lift his handset and answer the call before the machine comes automatically into operation. If the handset has not been lifted at the end of the delay period the apparatus should couple the machine to the line.

The interface system is preferably capable of performing the above functions whether the subscriber is connected to an automatic or manual exchange.

Once an incoming call has been answered the subscriber may wish to use his telephone answering machine to record a conversation with the caller. The machine should then present a high impedance to the line, and connection and disconnection of the high impedance should be carried out automatically by the interface system so as to avoid errors caused by a forgetful operator not switching in and out of correct impedance. Finally, the interface system should enable the subscriber to hand on a caller to the telephone answering machine, without losing his connection to the caller.

The present invention consists in apparatus for detecting the level of a direct current or voltage on a telephone line, comprising optical isolator means wherein a first semiconductor device is adapted to emit electromagnetic radiation whose intensity represents the level of current flowing through the device and a second semiconductor device is arranged to receive radiation emitted from the first device and to generate a current whose level represents the intensity of the radiation, means for connecting the first device in the isolator means across the line, and means for sensing only the direct current flowing through the second device in the isolator means and generating an output signal representative of the level of that direct current, and hence representative of the level of the direct current or voltage on the line.

The connecting means may be adapted to cause the level of direct current through the first device to be representative of the level of the direct voltage on the line.

In this case the sensing means are preferably adapted to generate first and second output signals representing direct voltages on the line which are respectively above and below a predetermined value. The connecting means may then further comprise switch means, and the apparatus may further comprise means for detecting an incoming alternating ringing or an outgoing alternating dialling signal on the line, control means adapted, when a ringing signal or dialling signal is detected by the detecting means, to operate the switch means, whereby the first semiconductor device in the isolator means is connected across the line and the sensing means generate the first output signal if a subscriber has not lifted a handset associated with the apparatus so as to establish a direct current path across the line and reduce the direct voltage on the line to a value below the predetermined value, and means which are adapted upon generation of the first output signal to couple a telephone answering machine associated with the apparatus to the line.

Preferably, the control means include ring delay means which delay operation of the coupling means for a predetermined interval of time after termination of the ringing signal and means which prevent operation of the coupling means if the subscriber lifts the handset to establish a direct current path across the line in the said interval of time.

The connecting means may be adapted to cause the level of the direct current through the first semiconductor device to be representative of the level of the direct current on the line. In this case the sensing means are preferably adapted to generate first and second output signals representing direct currents on the line which are respectively above and below a predetermined value. The connecting means may then further comprise resistive means whose resistance varies in accordance with the direct current applied thereto, and hence in accordance with the d.c. resistance of the line, the magnitude of the resistive means assuming a value such that the direct current on the line is not sufficient to drive the first or second semiconductor device into saturation. Preferably, the resistive means comprise a resistor having a positive temperature coefficient.

In one embodiment of the invention the connecting means comprise first connecting means adapted to cause the level of direct current through the first device to be representative of the level of the direct voltage on the line, and switch means, the sensing means are adapted to generate first and second output signals representing direct voltages on the line which are respectively above and below a predetermined value, the apparatus further comprises means for detecting an incoming alternating ringing or an outgoing alternating dialling signal on the line, control means adapted, when a ringing signal or dialling signal is detected by the detecting means, to operate the switch means, whereby the first semiconductor device in the isolator means is connected across the line by the first connecting means and the sensing means generate the first output signal if a subscriber has not lifted a handset associated with the apparatus so as to establish a direct current path across the line and reduce the direct voltage on the line to a value below a predetermined value, and means which are adapted, upon generation of the first output signal, to couple a telephone answering machine associated with the apparatus to the line, further connecting means which are adapted to cause the level of direct current through the first semiconductor device to be representative of the level of the direct current on the line, the control means being further adapted upon generation of the first output signal to operate the switch means to connect the said first device across the line via the further connecting means, the sensing means generating a second predetermined output signal if the subscriber lifts the handset to establish a direct current path across the line and cause the level of direct current through the said first device to fall below a second predetermined value whilst the answering machine is in use, and the coupling means being adapted upon generation of the second output signal to decouple the answering machine from the line.

The invention will now be described, by way of example with reference to the accompanying drawings, in which.

Figure 1A:
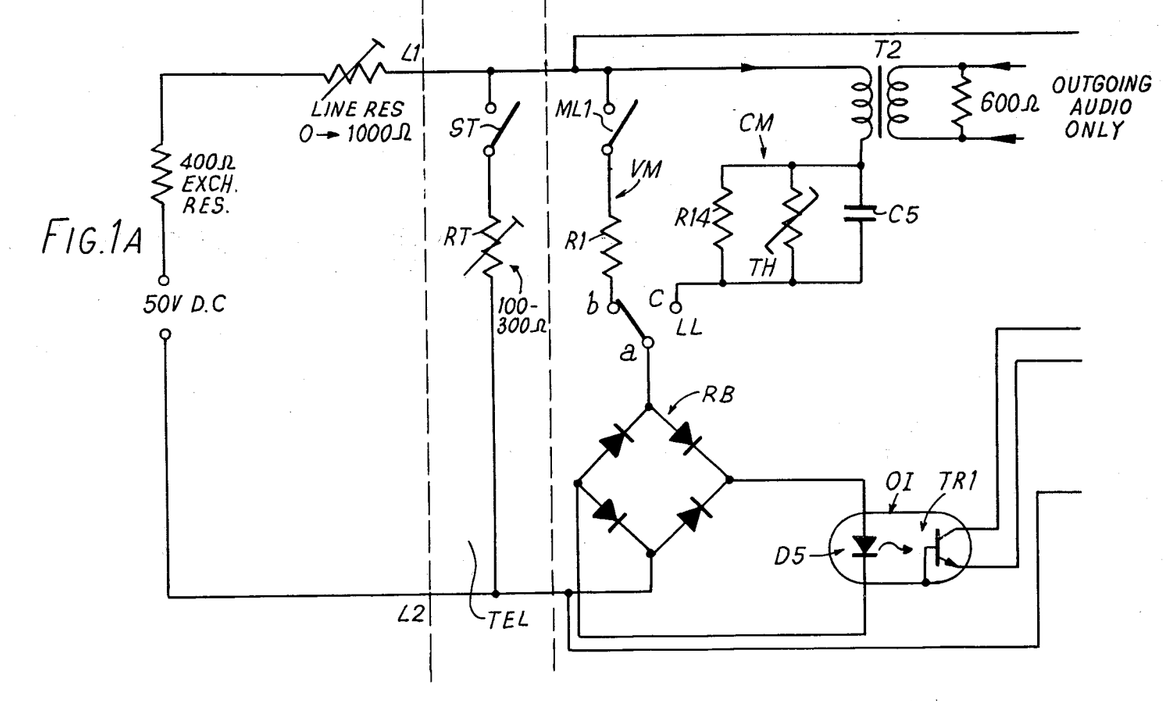
FIGS. 1A and 1B are a circuit diagram of an apparatus according to the invention which serves as an interface for coupling a telephone answering machine to a telephone line.
Figure 1B:
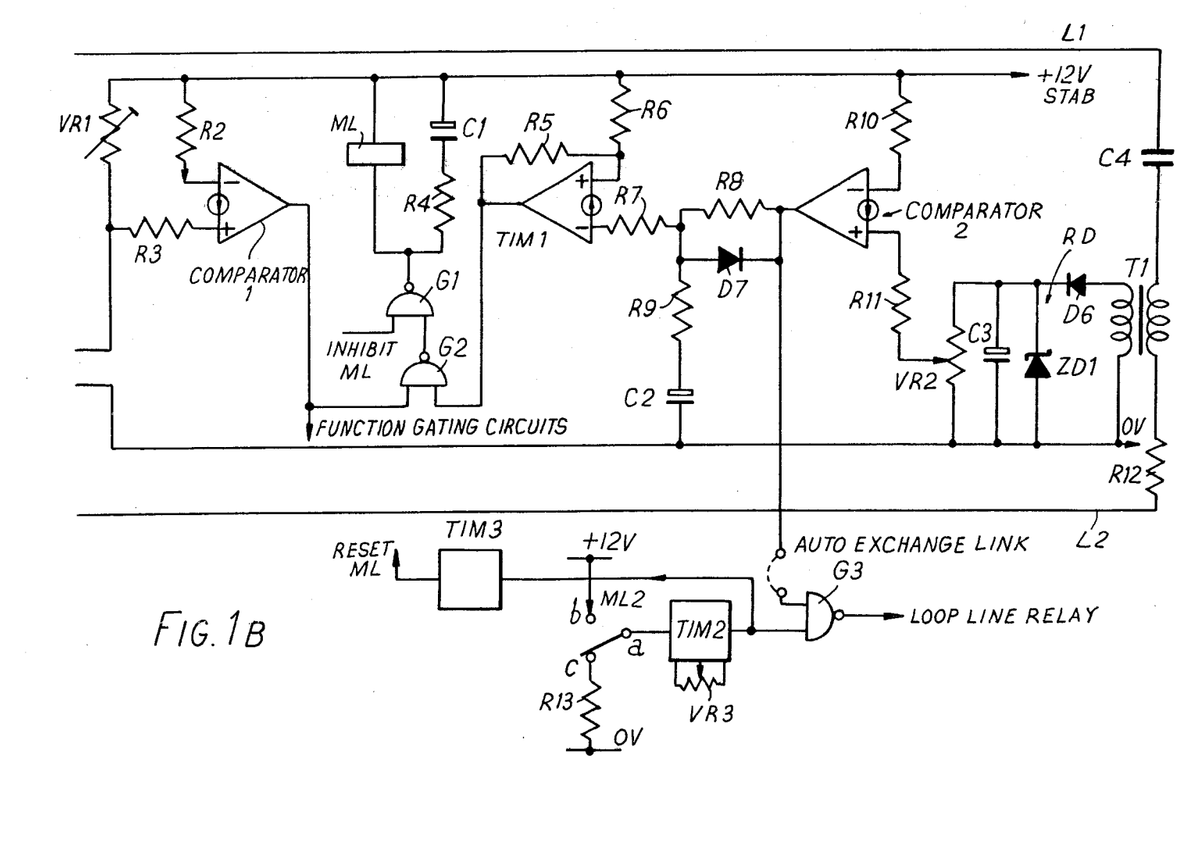
Figure 2:
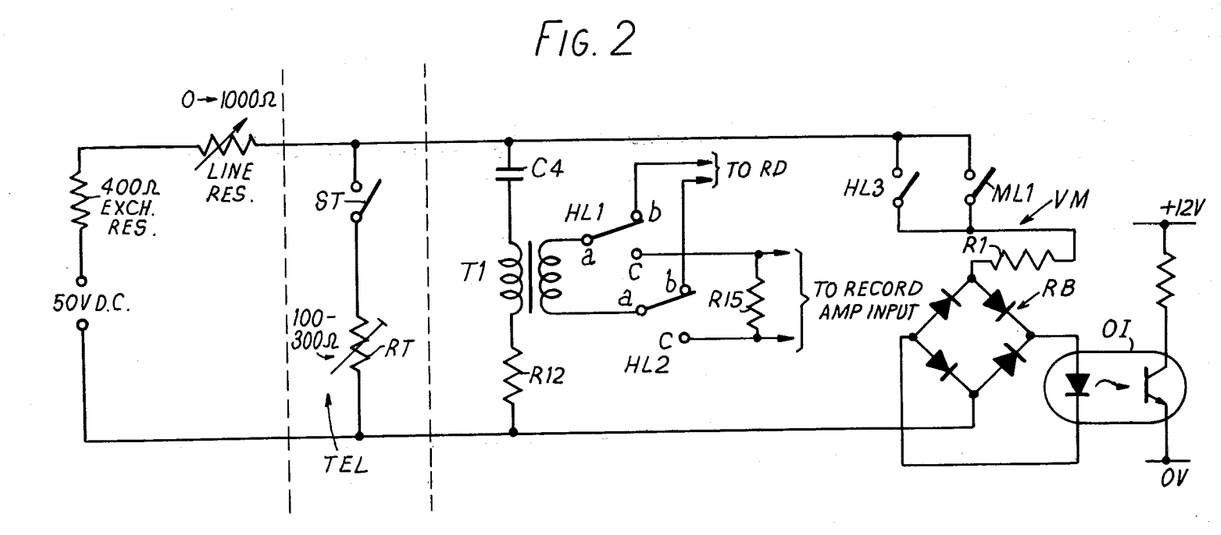
FIG. 2 shows further circuits which may be included in the apparatus of FIG. 1.

The apparatus shown in FIGS. 1A, 1B and 2 of the drawings is an interface system for coupling a telephone answering machine to a telephone line. The apparatus is designed to detect an incoming ringing signal or an outgoing dialling signal on a telephone line and to distinguish between these two kinds of signal by monitoring the level of the direct voltage on the line at the end of the signal. In the event that the signal is a ringing signal and that the call is not answered by the subscriber lifting his handset within a predetermined delay time, the apparatus operates to couple the telephone answering machine to the line. At the same time the apparatus switches to a second mode of operation in which the level of direct current on the line is monitored. Should the subscriber lift his handset during the current monitoring mode the apparatus operates to disconnect the telephone answering machine from the line. The apparatus can also be used in recording a conversation between the subscriber and a caller, a high impedance input being connected automatically at the input to the answering machine in place of the usual low impedance. Finally, the apparatus can operate automatically to switch the machine from a low impedance mode to a high impedance mode when the telephone handset is lifted and back to a low impedance mode when it is replaced.

FIGS. 1A and 1B of the drawings show the present apparatus connected to conductors L1 and L2 of a telephone line which extends from an exchange to the subscriber's extension. The line has a d.c. resistance between 0 and 1000 ohms and the conductors L1 and L2 of the line are connected to a source at the exchange which supplies direct current at 50 volts from a source resistance of 400 ohms. The polarity of the connections between the source and the line are unspecified.

At the subscriber's extension a telephone handset TEL having an internal resistance $R_T$ of 100 to 300 ohms and a cradle switch $S_T$ are connected in series between the conductors L1 and L2.

At the input to the present apparatus there is an optical isolator OI, formed of an encapsulated diode D5 and an n-p-n phototransistor TR1. The diode D5 is adapted to emit light whose intensity is linearly proportional to the level of current flow through the diode, over a wide range of input currents. Light emitted by the diode D5 falls on the phototransistor TR1 and results in a flow of current between the emitter and collector electrodes of the transistor. The level of the current through phototransistor TR1 is linearly proportional to the intensity of the light from the diode D5, and hence linearly proportional to the input current flowing through the diode.

The diode D5 of the optical isolator OI is connected between the output terminals of a rectifier bridge RB which serves as a polarity guard for the diode. The bridge RB has one input terminal thereof connected directly to the conductor L2 of the line and a second input terminal connected to a movable contact LLa of a set of contacts LLa to c. These contacts LLa to c form part of a line loop relay LL, hereinafter described.

A voltage monitoring circuit VM and a current monitoring circuit CM are provided for connecting the diode D5 and the polarity guard bridge RB between the conductors L1 and L2 of the line.

The voltage monitoring circuit VM is formed of a resistor R1 and a pair of contacts ML1, which are connected together in series between the conductor L1 and a fixed contact b of the contacts LLa to c. Contacts ML1 are part of a monitor line relay ML, hereinafter described.

The current monitoring circuit CM includes a thermistor TH and a secondary winding of an audio transformer T2, which are connected in series between the conductor L1 and a second fixed contact c of contacts LLa and c. As hereinafter described, the thermistor TH has a positive temperature coefficient of resistance and restricts current through the diode D5 to the range 30 to 40 mA, irrespectively of whether the apparatus is coupled to a long or a short telephone line. Connected in parallel with the thermistor TH are a resistor R14 and a capacitor C5, which, respectively limit the maximum resistance of the thermistor to 1000 ohms and by-pass a.c. signals.

On the output side of the optical isolator OI a collector electrode of the phototransistor TR1 is connected via a variable resistor VR1 to a 12 volt line from a stabilised power supply. An emitter electrode of the transistor TR1 is connected to an earth line from the supply.

Associated with the phototransistor TR1 is a voltage comparator, comparator 1, which provides a comparison between the direct voltage developed across the variable resistor VR1 and a reference voltage. Comparator 1 has a non-inverting input which is connected to the collector of transistor TR1 by a resistor R3 and an inverting input which is connected to the 12 volts supply line via a resistor R2. As hereinafter described, an output voltage from comparator 1 corresponds to a logic 1 or 0 condition according to the magnitude of the voltage at the non-inverting input. The output of comparator 1 is coupled to an input of a NAND gate, gate G2, and to certain function gating circuits in the telephone answering machine.

An input voltage for a second input to the gate G2 is derived from a circuit RD which detects an incoming ringing signal or dialling signal on the telephone line. This detecting circuit RD is coupled to the gate G2 via a timer TIM1, which prevents the gate from operating if the apparatus receives a test signal of duration less than 300 ms, say, 100 m/secs, generated at the telephone exchange.

At the input to the detecting circuit RD there is a transformer T1 whose primary winding is connected in series with a resistor R12 and a capacitor C4 between the conductors L1 and L2 of the telephone line. One terminal of the secondary winding of transformer T1 is connected to a positive electrode of a diode D6, which forms part of a rectifier circuit, and the other terminal of the winding is connected to earth potential. In the rectifier circuit a capacitor C3 and a potentiometer VR2 are connected in parallel between the negative electrode of the diode D6 and earth potential and a zener diode ZD1 is also connected in parallel with the capacitor C3 and potentiometer VR2.

A movable contact of the potentiometer VR2, which serves as an output from the detecting circuit, is connected via a resistor R11 to a non-inverting input of a second voltage comparator, comparator 2. An inverting input of the comparator 2 is connected to the 12 volts supply line by means of a resistor R10.

At the output of comparator 2 there is a parallel circuit formed of a resistor R8 and a diode D7 which is connected to an inverting input of the timer TIM1 via a further resistor R7. A resistor R9 and capacitor C2 are connected together in series between earth potential and the end of resistor R7 remote from the timer. A non-inverting input of the timer TIM1 is connected to the 12 volts supply line by a bias resistor R6 and this input is also connected to an output of the timer via a resistor R5. The output of the timer TIM1 is also directly connected to a second input of the NAND gate G2.

An output of the gate G2 is connected to a first input of a further NAND gate, gate G1, and a second input of the gate G1 is connected to an output line from the answering inhibit circuitry of the machine. A winding of the relay ML is connected between an output of the gate G1 and the 12 volts supply line, and a release delay circuit for the relay, made up of a resistor R4 and capacitor C1, is connected in parallel with the winding.

To allow a reasonable time for a subscriber connected to an automatic exchange to answer an incoming call the present apparatus is provided with a ring delay timing circuit TIM2 and a "window" timing circuit TIM3 which delay connection of the telephone answering machine to the line for a predetermined interval of time after commencement of the ringing signal.

The ring delay timer TIM2 has an input connected to a movable contact $a$ of a further set of contacts ML2$a$ to $c$ of the relay ML. Contact $b$ of the set ML2$a$ to $c$ is a fixed contact which is connected directly to the 12 volts supply line and contact $c$ is a further fixed contact which is connected to earth potential via a resistor R13. An output of the ring delay timer TIM2 is connected to one input of a further NAND gate, gate G3, and to the window-timing circuit TIM3, which in turn provides an output for re-setting the relay ML.

The timer TIM2 is provided with a variable resistor VR3 which enables the delay imposed by the timer to be varied between 2 and 15 seconds.

A second input of gate G3 is connected via an automatic exchange link to the output of comparator 2 and the output of the gate G3 is connected to the loop line relay LL, not shown. The link is present when the machine is to be used on an automatic telephone exchange and omitted for manual exchange use.

FIG. 2 shows additional circuits which may be included in the present apparatus so as to enable the associated answering machine to be used for recording a conversation between the subscriber and a caller.

As shown in FIG. 2, the additional circuits include two sets of relay contacts HL1 and HL2 which are provided between the input transformer T1 and the ring detecting circuit RD, described above. Each of these sets of contacts includes a movable contact $a$ and a fixed contact $b$ which are connected together during normal operation, thereby connecting the transformer T1 to the circuit RD. Also included in each set is a further fixed contact $c$, the two contacts $c$ being connected to respective input terminals of a recording amplifier (not shown) in the answering machine and being connected together via a resistor R15 of 10 kilo ohm resistance. The resistor R15 in the drawing represents the input impedance of the record amplifier. A further pair of relay contacts HL3 are connected in parallel with the contacts ML1.

Figure 3:
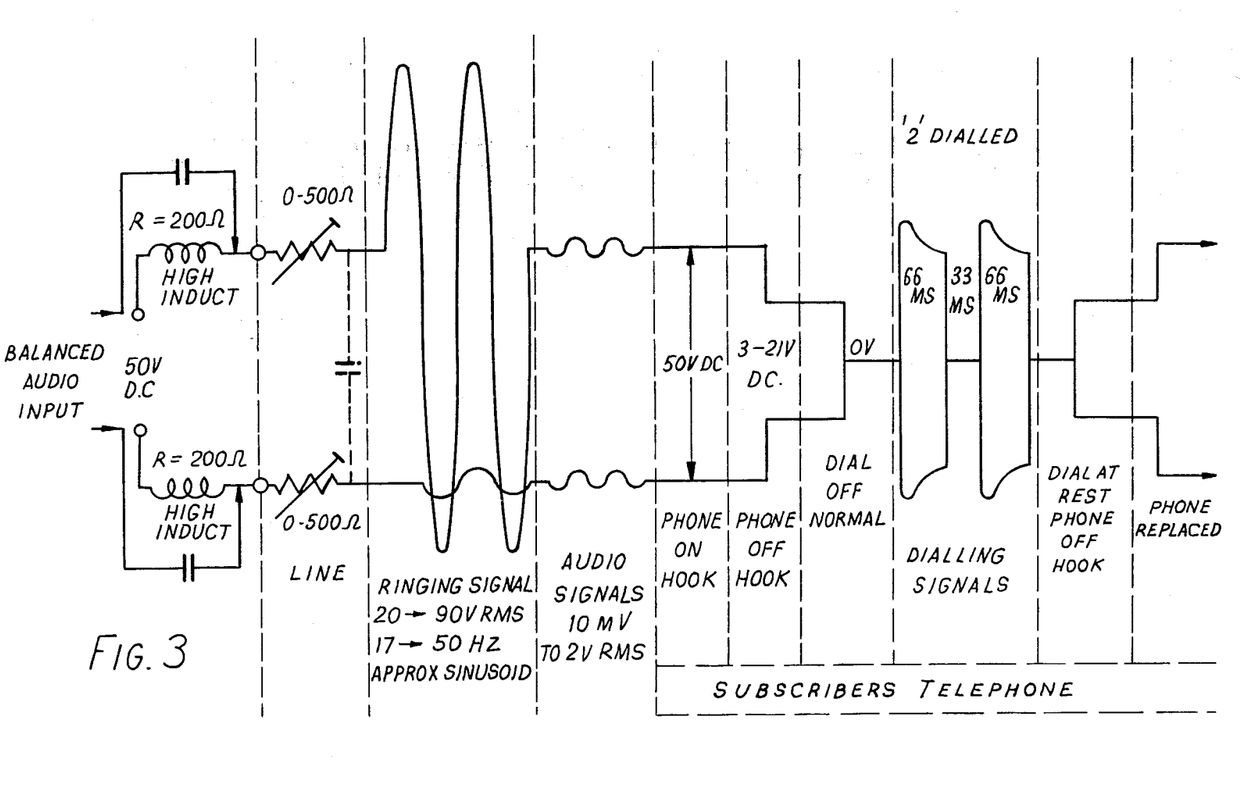
FIG. 3 shows a.c. and d.c. voltages on a telephone line at various stages during operation of the apparatus of FIG. 1.

FIG. 3 of the drawings shows the d.c. and a.c. voltages on a telephone line connected to the present apparatus at various stages during dialling and answering a telephone call.

As indicated in FIG. 3, the a.c. signals include audio signals, ringing signals and dialling signals.

The audio signals are applied to the line from the exchange as a balanced audio input from high inductive impedances. They are from 10mV to 2 volts r.m.s. The ringing signals are generated by an operator at a manual exchange or by a caller at a remote location in the case of subscribers connected to an automatic exchange. Typical ringing signals take the form of short bursts of current, each burst being approximately 400 ms in duration and there being an interval of approximately 200 ms between bursts. Within each burst the signal can vary from sinusoidal to triangular in wave form, has a frequency of 17 to 50 Hz. and is from 20 to 90 volts r.m.s. Finally, the dialling signals, which are generated by the subscriber himself, are approximately square waves. Each square wave lasts for approximately 66 ms and has an amplitude of 50 volts peak or more, and there is an interval of approximately 33 ms between succeeding square waves.

The number of square waves is equal to the number which is being dialled. Thus, when dialling the number '3' there are three square waves generated and the total duration of the signals is about 300 ms. When dialling the number '0' there are ten square waves and the signal lasts for about 1 second.

One of the functions of the present apparatus is to distinguish between an incoming ringing signal on a line and a dialling signal generated by the subscriber himself. To distinguish between the different waveforms of the signals is difficult or even impossible since the dialling signals may be considerably distorted by various factors such as distributed line capacitance, line resistance and, on short lines, by exchange relay inductance. To distinguish between the levels of the different signals is a possibility where the line is short and the level of the ringing signal is high, but this requires local adjustment of ringing sensitivity. Finally, discrimination between the mark: space ratios of the signals is unreliable owing to distortion, and frequency discrimination is also difficult owing to the small differences in frequency.

For these reasons, the present apparatus is designed to detect differences in the levels of direct voltages and currents at various stages of operation.

Referring again to FIG. 3, direct voltages are shown for a situation where there is a d.c. source at the exchange and a d.c. resistance of 400 ohms, as described above. There is a d.c. line resistance of 0 to 1,000 ohms, as also mentioned above.

As long as the subscriber's handset is at rest there is a d.c. voltage on the line of 50 volts. When the handset is lifted, thereby closing the cradle switch $S_T$ shown in FIG. 1, the direct voltage falls to a value between 3 volts and 20 volts. If the subscriber operates his dial the direct voltage falls to 0 volts between each square wave of the dialling signal but returns to a value between 3 volts and 20 volts when the dial is at rest at the end of the signal.

Referring again to FIGS. 1A and 1B of the drawings, the conditions of the various switches and contact are those appropriate to the situation where the apparatus is connected to the telephone line and is in a standby condition.

In this condition the relay ML is de-energised so that contacts ML1 and ML2 are open.

With contacts ML1 open there is no current through the diode D5, and the phototransistor TR1 is non-conducting. The values of resistors R2 and R3 and variable resistor VR1 are such that the voltage at the non-inverting input of comparator 1 is greater than the voltage at the inverting input, and the output of the comparator is then at or near the rail voltage i.e. + 12 volts.

With no ringing or dialling signal on the line L1, L2 there is no input voltage applied to the non-inverting input of comparator 2. Accordingly the bias voltage developed across the resistor R10, connected to the inverting input of comparator 2, is sufficient to cause the output of this comparator to be at 0 volts. The 300 ms timer TIM1 is then biased via resistors R5 and R6 to a condition where the output thereof is at rail voltage.

Both inputs to the gate G2 are therefore at rail voltage i.e. in the logic 1 condition, and the output of the gate is in a logic 0 condition. This means that gate G1 has a logic 0 on one input and a logic 1 on its other input, from the answering inhibit circuitry of the telephone answering machine.

With contacts ML2 open, as mentioned above, the input to the ring delay timer TIM2 is at earth potential, and the timer is therefore in a reset condition.

If an incoming signal appears on the telephone line L1, L2, or if the subscriber lifts his handset and generates a dialling signal, the signal is developed across the primary winding of the input transformer T1 and applied to the rectifier circuit in the detecting circuit RD, which is connected to the secondary winding of the transformer. The time constant of the rectifier circuit is such that a voltage having a waveform corresponding to the envelope of the signal is produced across the capacitor C3 and the variable resistor VR2.

If a '0' is dialled, for example, the voltage produced by the rectifier circuit has a duration of approximately 1 second. At input levels below 10 volts r.m.s. the zener diode ZD1 is inoperative but at higher voltage levels the diode conducts and limits the voltage developed across the capacitor C3.

From the variable resistor VR2 the dialling or ringing signal is applied to the non-inverting input of the comparator 2, causing the output of the comparator to switch to rail voltage for the duration of each burst of the signal. Assuming that the envelope of the signal lasts for longer than 300 ms, (i.e. the signal is a ringing signal or a dialling signal representing '3' or more), the output of the timer TIM1, which is coupled to comparator 2, falls from rail voltage to a low voltage, i.e. to a logic 0 condition. This voltage from the output of timer TIM1 is applied to one input of the gate G2, causing the output of the gate to switch to a logic 1 condition. With the output of gate 2 in a logic 1 condition the output of gate G1 is switched to a logic 0 condition, allowing current to flow through the winding of the relay ML.

Once the relay ML is energised in this manner the relay contacts ML1 are closed and the movable contact c of contacts ML2a to c is connected to contact b.

The closing of contacts ML1 allows current to flow between the conductors L1 and L2 via the voltage monitoring circuit VM i.e. via contacts ML1, resistor R1, contacts LLa and b, the polarity guard bridge RB and the light emitting diode D5 in the isolator OI. Light is emitted from the diode D5, falls on the phototransistor TR1 and causes a current to flow between the emitter and collector electrodes of the transistor. As indicated above, the amplitude of the current through transistor TR1 is proportional to the current through the diode D5. In view of the high resistance of the resistor R1 the current is representative of the voltage between conductors L1 and L2 of the telephone line.

If the direct voltage between the conductors L1 and L2 is above 20 volts the current through the transistor TR1 is sufficient to cause the voltage at the non-inverting input of the comparator 1 to fall below the voltage at the inverting input. The output of the comparator 1 is therefore switched to a logic 0 condition, which is applied to an input of the gate G2 and serves to maintain the outputs of gates 2 and 1 in conditions such that relay ML is energised. In other words, the optical isolator OI and comparator 1 provide a self-hold circuit for the relay ML.

The capacitor C1 and resistor R4 prevent the relay ML from releasing whilst the voltage on the line is settling down after a high level signal burst.

Whilst the relay ML is energised the relay contacts ML2 are closed, as mentioned above. The input of the ring delay timer TIM2 is therefore connected to the 12 volts supply and the timer runs up.

Assuming that the signal on the line L1, L2 is an incoming ringing signal and that the subscriber's handset remains on the cradle, the d.c. voltage on the line remains above 20 volts in the intervals between successive bursts of signal. The relay ML therefore remains energised via the self-hold circuit.

If the subscriber is connected to a manual exchange, the output of the ring delay timer TIM2 is switched at the end of a 10 second delay period. This causes an output signal to be applied from the gate G3 to the line loop relay. The relay is therefore energised and the movable contact a of contacts LLa to c is disconnected from contact b and connected to contact c, thereby connecting the diode D5 between conductors L1 and L2 of the line via the current monitoring circuit CM. Included in the circuit CM is the secondary winding of the transformer T2 at the input to the telephone answering machine, which is also coupled to the line.

If the subscriber is connected to an automatic exchange, the second input of the gate G3 is connected to the output of comparator 2 via the auto exchange link. As in the case of manual exchange, the ring delay timer TIM2 begins to run up at the first burst of ringing current and its output is switched after a delay of 10 seconds. If a further burst of ringing current is received in a short interval of time after this 10 seconds delay a pulse is applied to the second input of the gate G3 via the auto exchange link. It is only then that the output of gate G3 is switched to operate the line loop relay, as described above. If there is no further burst of ringing current during the short interval of time, indicating that a caller has replaced his handset, the "window" timing circuit TIM3 runs up and provides an output signal which resets the relay ML, thereby opening the contact ML1 to disconnect the voltage monitoring circuit VM from the line, and switching the contacts ML2, to cause the ring delay timer TIM2 to be reset.

If the subscriber lifts his handset to answer the call within the 10 secs. delay period set by the ring delay timer TIM2 the voltage on the line falls to 20 volts or below, as shown in FIG. 3, as a result of the switch $S_T$ closing and shunting the apparatus. The current through the diode D5 then falls, as does the current through the transistor TR1. Comparator 1 is turned off and the relay ML is de-energised, causing contacts ML1 to open and disconnect the voltage monitoring circuit VM from the line. Contacts ML2 are also switched, causing the ring delay timer TIM2 to be reset.

If the a.c. signal on the line L1, L2 is a dialling signal generated by the subscriber himself, the direct voltage on the telephone line is low, i.e. well below 20 volts, between each burst of signal. No self-hold circuit is then provided for the relay ML, which is simply energised during each burst of signal and released between bursts. The ring delay timer TIM2 runs up and is reset for each burst. At the end of a dialling train the handset is still lifted, the d.c. voltage on the line is low, and the relay ML is de-energised.

At the end of the ring detection and delay sequence described above, the telephone answering machine is connected to the line and the relay LL is energised to connect the diode D5 of the optical isolator OI to the line via the current monitoring circuit CM.

Before describing the operation of the apparatus in this condition, reference is made to the direct current and voltage on a telephone line from an exchange to a subscriber when a handset or a telephone answering machine which is not provided with the present apparatus is connected across the line. In each case it can be assumed that the source at the exchange provides a d.c. voltage of 50 volts from an internal resistance of 400 ohms and the d.c. resistance of the handset or machine is 100 ohms. For a short line, zero line resistance, the direct current is then approximately 100 mA. For a long line, 1000 ohms, resistance, the direct current is 33 mA. Clearly, no reliable information regarding connections to the line can be obtained from detecting the direct current on the line if the current varies in this manner with the distance of the subscriber from the exchange.

It is to overcome this problem that the thermistor TH is included in the present apparatus. The thermistor has a resistance of about 100 ohms when it is passing a low current and is therefore cool. Connecting the current monitoring circuit CM, which includes the parallel circuit formed by thermistor TH and the resistor R14, between the conductors L1 and L2 of a long line has little effect on the current on the line. At higher currents, such as those which appear on a short line, the resistance of the parallel circuit formed by thermistor TH and resistor R14 is increased to about 800 ohms. The effect of the thermistor TH on a short line is to reduce the d.c. current on the line to about 40 mA.

In the result, the d.c. line current only varies between 32 and 40 mA whether the present apparatus is connected to a short line or a long line.

When the present apparatus is switched to the current monitoring mode of operation, as described above, a line current of 25 mA or more causes sufficient current through the transistor TR1 for the output of comparator 1 to be switched to a logic 0 condition. Relay M1 is not then energised because an "inhibit" voltage, a logic 0 condition, is applied to the inhibit input of the gate G1 from the line loop relay switching circuit.

As long as the subscriber's handset remains on its reset the current through the diode D5 is about 33 mA when the apparatus is connected to a long line and about 40 mA when connected to a short line. In both cases the output from comparator 1 is therefore in a logic 0 condition.

If the apparatus is connected to a long line and the subscriber lifts his handset whilst the apparatus is operating in the current monitoring mode, a maximum resistance of 300 ohms is placed in parallel with the 150 ohms input resistance of the line looping circuit, which includes the current monitoring circuit CM. This reduces the terminal voltage from 5 volts to 3 volts and reduces the current through the diode D5 from 33 mA to 20 mA. The output of comparator 1 is then switched to a logic 1 condition.

If the apparatus is connected to a short line and the subscriber lifts his handset the resistance of 300 ohms is connected in parallel with the 800 ohms resistance of the current monitoring circuit CM. This gives a termination resistance of 200 ohms and a terminal voltage of 16 volts. The thermal time constant of the thermistor TH is 1 to 2 seconds and its resistance remains at 800 ohms for this length of time. There is then a current through the diode D5 of 16 ÷ 800 = 20 mA, and the output of the comparator 1 is therefore switched to a logic 1 condition.

As mentioned above, the output of the comparator 1 is connected to various function gating circuits (not shown) in the telephone answering machine. The appearance of a logic 1 condition at the output of comparator 1 causes one of these circuits to disconnect the machine from the line. If the subscriber replaces his handset the output of comparator 1 returns to the logic 0 condition and the function gating circuits re-connect the telephone answering machine to the line.

The circuit of FIG. 2 enables a telephone conversation between the subscriber and a caller to be recorded. The circuit is manually operated by the subscriber by means of a press-button on his telephone answering machine. Operation of the press-button causes the relay HL to be energised and the relay contacts HL1 and HL2 then disconnect the transformer T1 from the ring detector circuit RD and connect it to the input to the recording amplifier in the answering machine. In addition, contacts HL3 are closed so that the voltage monitoring circuit VM is connected to the telephone line.

With the apparatus in this condition the primary winding of the transformer T1 together with the series capacitor C4 and resistor R12 provide an impedance which, in conjunction with the resistance of the voltage detection circuit, causes a shunt signal loss of only 0.3 dB. The only d.c. path across the line is via the resistor R1.

The present apparatus also enables the subscriber to use his telephone answering machine in a loudspeaker monitoring mode of operation. In this mode the machine is connected to the telephone line and the caller's message is being recorded. At the same time the incoming message is fed to the loudspeaker in the machine so that the subscriber can listen to the message whilst recording. In the United Kingdom this mode of operation is not allowed if it is possible for the loudspeaker to remain in circuit whilst the subscriber's handset is lifted, there then being a danger of acoustic feedback from the loudspeaker to the handset. With the present apparatus, the effect of the subscriber lifting his handset is to close the cradle switch $S_T$ and to cause a reduction in current through the diode D5. The current through the transistor TR1 then falls to a level at which the output from the comparator 1 switches to a logic 1 condition. This causes one of the function gating circuits in the telephone answering machine to disconnect the loudspeaker.

Alternatively, the function gating circuits can be arranged so that when the comparator 1 switches to the logic 1 condition the machine is completely disconnected from the telephone line.

Another operation performed by the present apparatus is to provide a fail-safe method of sensing the so-called "disconnect pulse" which is generated at some exchanges when a remote caller replaces his handset. The "disconnect pulse" is in fact a gap in line current of approximately 2 ms duration. This gap is detected by the apparatus, operating in the current monitoring mode of operation, since it causes a switch in the output of comparator 1. Function gating circuits connected to comparator 1 then operate to disconnect the subscriber's telephone answering machine from the line.

With suitable gating the apparatus can also be used to provide automatic switching of the machine between the normal line-looping mode of operation and the high input impedance condition. Assuming that a call has been answered by the telephone answering machine and that the apparatus is in the low impedance loop condition, lifting of the subscriber's handset can be used to operate a signal which causes relay LL to be released. The telephone is now providing the loop and the machine has only the high impedance transformer T1 and the voltage monitoring circuit VM across the line. If the handset is replaced, the rise in line voltage can be used to re-energise the relay LL, the machine providing the line loop again. Switching between the low and high impedance conditions can be repeated indefinitely.

From the foregoing it will be appreciated that switching to the high impedance mode is necessary when the line is double terminated, i.e. by the machine and by the telephone set, and that this is the condition for recording both sides of a telephone conversation. Therefore if the machine is one which is fitted with the loudspeaker monitor facility, arrangements will of course be made to ensure that the loudspeaker is switched out of circuit whenever the machine operates in the high impedance mode.

In conclusion, it will be appreciated that the presence of the optical isolator OI in the present apparatus ensures that there is a satisfactory isolation between the telephone answering machine and the telephone line L1, L2. In fact there is an insulation resistance of + 2.5 KV and a d.c. resistance of many megohms. The capacitative coupling between the line and the machine is about 1pf at audio frequencies, ensuring that there is negligible imbalance on the line.

I claim:

1. An apparatus for detecting the level of a direct current or voltage on a telephone line having two conductors, comprising optical isolator means wherein a first semiconductor device is adapted to emit electromagnetic radiation whose intensity represents the level of current flowing through the device and a second semiconductor device is arranged to receive radiation emitted from the first device and to generate a current whose level represents the intensity of the radiation, means for connecting the first device in the isolator means between the two conductors of the telephone line, and means for sensing only the direct current flowing through the second device in the isolator means and generating an output signal representative of the level of that direct current, and hence representative of the level of the direct current or voltage on the line.

2. An apparatus as claimed in claim 1, wherein the connecting means is adapted to cause the level of direct current through the first device to be representative of the level of the direct voltage on the line.

3. An apparatus as claimed in claim 2, wherein the sensing means is adapted to generate first and second output signals representing direct voltages on the line which are respectively above and below a predetermined value.

4. An apparatus as claimed in claim 3, wherein the connecting means further comprise switch means, and the apparatus further comprises means for detecting an incoming alternating ringing or an outgoing alternating dialling signal on the line, control means adapted, when a ringing signal or dialling signal is detected by the detecting means, to operate the switch means, whereby the first semiconductor device in the isolator means is connected across the line and the sensing means generate the first output signal if a subscriber has not lifted a handset associated with the apparatus so as to establish a direct current path across the line and reduce the direct voltage on the line to a value below the predetermined value, and means which are adapted upon generation of the first output signal to couple a telephone answering machine associated with the apparatus to the line.

5. An apparatus as claimed in claim 4, wherein the control means include ring delay means which delay operation of the coupling means for a predetermined interval of time after termination of a ringing signal, and means which prevent operation of the coupling means if the subscriber lifts the handset to establish a direct current path across the line in the said interval of time.

6. An apparatus as claimed in claim 5 for use with a telephone line from an automatic exchange, the apparatus further comprising means for applying a further signal from the detecting means to the ring delay means each time a ringing signal is detected, and means which prevent operation of the coupling means if no further signal is applied to the ring delay means within a short interval of time after the said interval of time.

7. An apparatus as claimed in claim 4, wherein the control means include a timer which is adapted to prevent operation of the switch means by the control means if the detecting means detect a spurious ringing signal having a duration less than a predetermined duration.

8. An apparatus as claimed in claim 4, comprising further connecting means which are adapted to cause the level of direct current through the first semiconductor device to be representative of the level of the direct current on the line, the control means are adapted, upon generation of the first output signal, to operate the switch means to connect the said first device across the line via the further connecting means, the sensing means generate a second predetermined output signal if the subscriber lifts the handset to establish a direct current path across the line and cause the level of direct current through the first device to fall below a second predetermined value whilst the telephone answering means is in use, and the coupling means are adapted upon generation of the second output signal to decouple the telephone answering machine from the line.

9. An apparatus as claimed in claim 8, comprising means adapted, upon generation of the second output signal, to disconnect a loudspeaker from the telephone answering machine.

10. An apparatus as claimed in claim 8, wherein the sensing means generate the second predetermined output signal if there is a gap of predetermined duration in the direct current on the line.

11. An apparatus as claimed in claim 4, comprising manually operable switch means for connecting an input to a recording amplifier in the telephone answering machine across the line in place of the ring detecting means and for operating the switch means so as to connect the first semiconductor device and a high resistance in series therewith across the line, whereby a telephone conversation between the subscriber and a distant caller is recorded.

12. An apparatus as claimed in claim 3, wherein the connecting means further comprise resistive means whose resistance varies in accordance with the direct current applied thereto, and hence in accordance with the d.c. resistance of the line, the magnitude of the resistive means assuming a value such that the direct current on the line is not sufficient to drive the first or second semiconductor device into saturation 13. An apparatus as claimed in claim 12, wherein the resistive means comprise a resistor having a positive temperature coefficient.

14. An apparatus for detecting the level of a direct current on a telephone line, comprising optical isolator means wherein a first semiconductor device is adapted to emit electromagnetic radiation whose intensity represents the level of current flowing through the device and a second semiconductor device is arranged to receive radiation emitted from the first device and to generate a current whose level represents the intensity of the radiation, means for connecting the first device in the isolator means between the conductors of the line, the connecting means comprising resistive means adapted to cause the level of direct current through the first semiconductor device to be representative of the level of direct current on the line and having a resistance which varies in accordance with the direct current applied thereto, and hence in accordance with the d.c. resistance of the line, the magnitude of the resistive means assuming a value such that the direct current on the line is not sufficient to drive the first or second semiconductor device into saturation even with a short telephone line, means for sensing only the direct current flowing through the second semiconductor device and generating a first output signal when the direct current through the first semiconductor device is that given when a telephone answering machine associated with the apparatus is connected between the conductors of the line and a second output signal when the direct current through the first semiconductor device falls upon a subscriber lifting a handset associated with the apparatus and establishing a direct current path across the line, and means which are adapted upon generation of the second output signal to decouple the telephone answering machine from the line.

15. Apparatus for detecting the level of a direct current or voltage on a telephone line, comprising optical isolator means wherein a first semiconductor device is adapted to emit electromagnetic radiation whose intensity represents the level of current flowing through the device and a second semiconductor device is arranged to receive radiation emitted from the first device and to generate a current whose level represents the intensity of the radiation, means for connecting the first device in the isolator means between the conductors of the line, the connecting means being adapted to cause the level of direct current through the first device to represent the level of direct voltage on the line, means for sensing the direct current flowing through the second device and generating a first output signal if the direct current is above a predetermined value which represents a direct voltage on the line equal to or above that given when a subscriber has not established a direct current path across the line by lifting a handset associated with the apparatus to dial a dialing signal or to receive an incoming ringing signal, further connecting means which are adapted to cause the level of direct current through the first semiconductor device to represent the level of direct current on the line, and control means adapted, when the sensing means generate the first output signal, to couple a telephone answering machine associated with the apparatus to the line and to actuate the further connecting means so that the first device is connected between the conductors of the line by the further connecting means, the sensing means being adapted to generate a second output signal if the subscriber lifts the handset to establish a direct current path across the line and causes the level of direct current through the first device to fall below a second predetermined value whilst the telephone answering machine is in use, and the control means being adapted when the second output signal is generated to decouple the telephone answering machine from the line.

16. An apparatus for detecting the level of a direct voltage on a telephone line, comprising optical isolator means wherein a first semiconductor device is adapted to emit electromagnetic radiation whose intensity represents the level of current flowing through the device and a second semiconductor device is arranged to receive radiation emitted from the first device and to generate a current whose level represents the intensity of the radiation, means for connecting the first device in the isolator means between the conductors of the line, the connecting means comprising switch means and means adapted to cause the level of direct current through the first semiconductor device to be representative of the level of the direct voltage on the line, means for detecting an incoming alternating ringing signal or an outgoing alternating dialling signal on the line, control means adapted, when a ringing or dialling signal is detected by the detecting means, to operate the switch means, whereby the first semiconductor device is connected between the conductors of the line, means for sensing the direct current flowing through the second device and generating an output signal if the direct current is above a predetermined value which represents a direct voltage on the line equal to or above that given when a subscriber has not established a direct current path across the line by lifting a handset associated with the apparatus to dial a dialling signal or to receive an incoming ringing signal, and means adapted upon generation of the output signal to couple a telephone answering machine associated with the apparatus to the line.

* * * * *